United States Patent [19]

Knapp

[11] Patent Number: 5,664,603
[45] Date of Patent: Sep. 9, 1997

[54] MIXER VALVE HAVING A BALL VALVE ELEMENT AND UPPER SEALING GASKET

[75] Inventor: Alfons Knapp, Klockstr, Germany

[73] Assignee: Masco Corporation, Taylor, Mich.

[21] Appl. No.: 295,897

[22] PCT Filed: Jun. 10, 1994

[86] PCT No.: PCT/US94/06569

§ 371 Date: Sep. 3, 1996

§ 102(e) Date: Sep. 3, 1996

[87] PCT Pub. No.: WO95/10725

PCT Pub. Date: Apr. 20, 1995

[30] Foreign Application Priority Data

Oct. 8, 1993 [IT] Italy ............... 93A00732A

[51] Int. Cl.$^6$ ............... F16K 11/087
[52] U.S. Cl. ............... 137/625.4; 137/625.41
[58] Field of Search ............... 137/625.17, 625.4, 137/625.41

[56] References Cited

U.S. PATENT DOCUMENTS 5,018,553 5/1991 Grassberger et al. ............ 137/625.41
5,195,555 3/1993 Knapp ............ 137/454.6

Primary Examiner—John Fox
Attorney, Agent, or Firm—Reising, Ethington, Barnard & Perry

[57] ABSTRACT

A mixer valve (10) includes a valve housing (12) that mounts a cartridge (26). The ball valve element (24) is vertically affixed within the cartridge housing (56) by a pin (60) extending through the ball valve element and having its distal ends (62) received in a pair of circumferentially extending slots (68). A gasket (98) having generally square cross section seals the upper section (99) of the ball valve element from water leakage and provides operating resistance to the ball valve element. The optional ring member (140) is biased against the ball valve element (24) by the sealing gasket (98) to add to the operating resistance of the ball valve element (24).

12 Claims, 5 Drawing Sheets

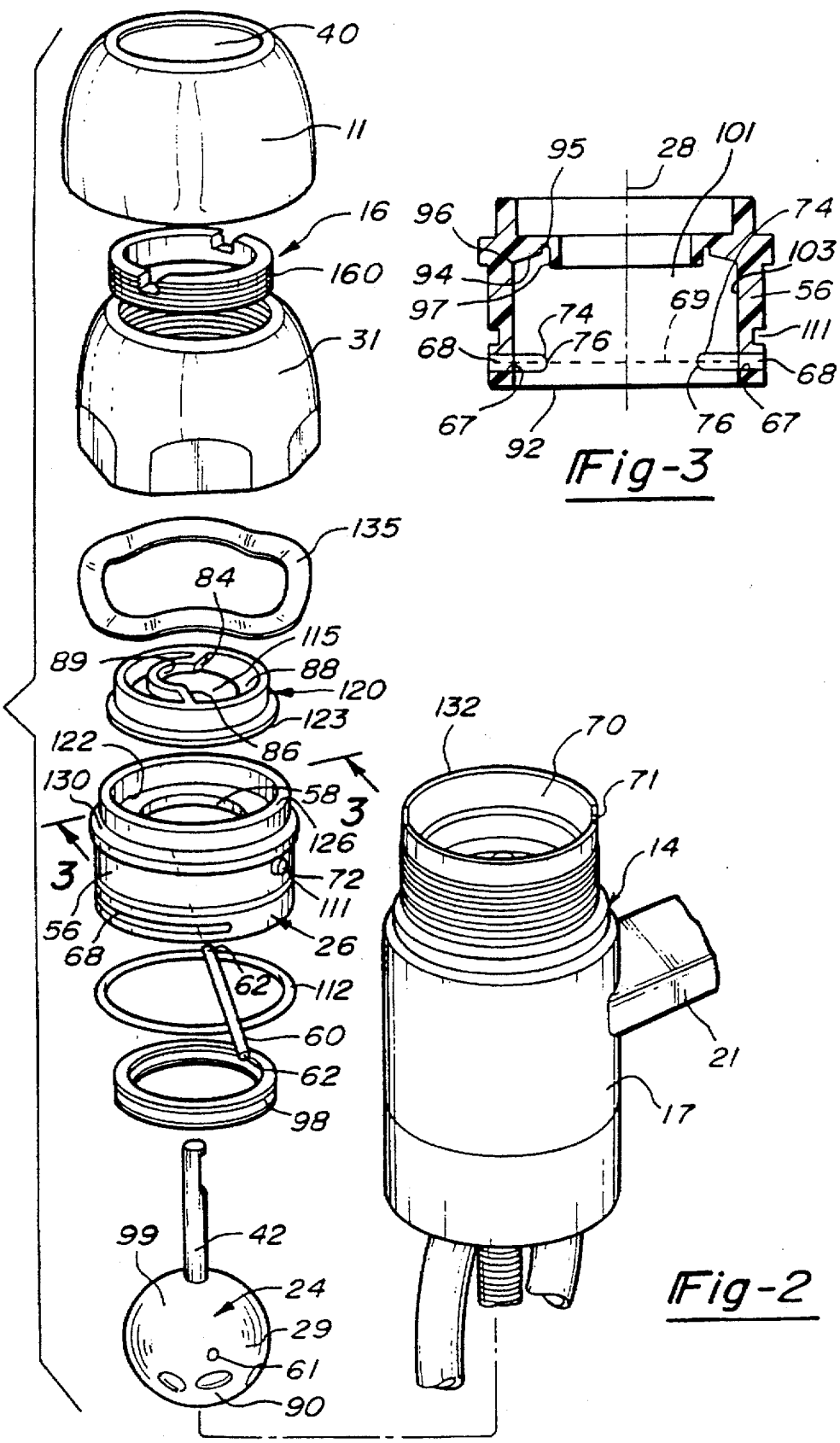

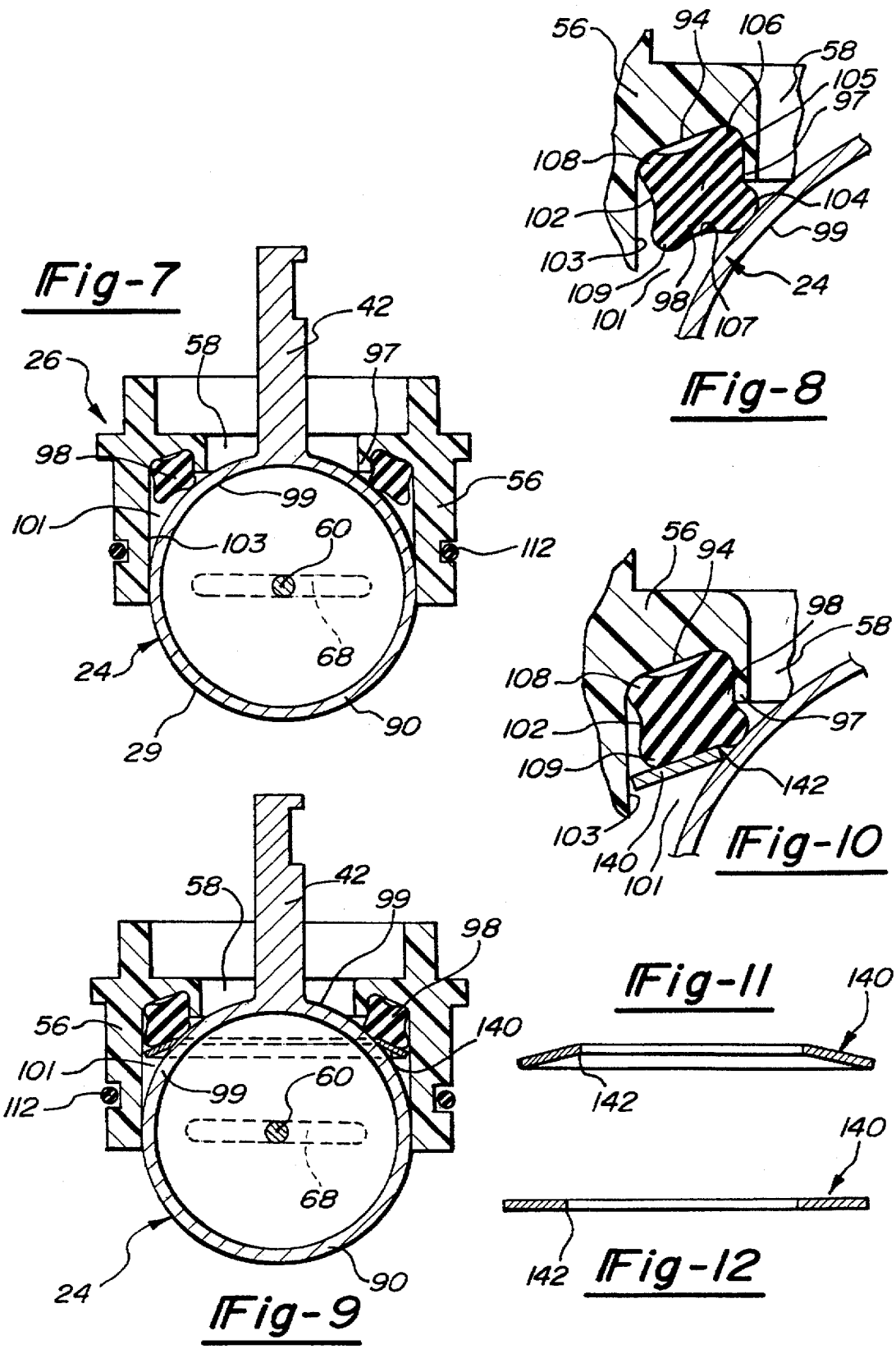

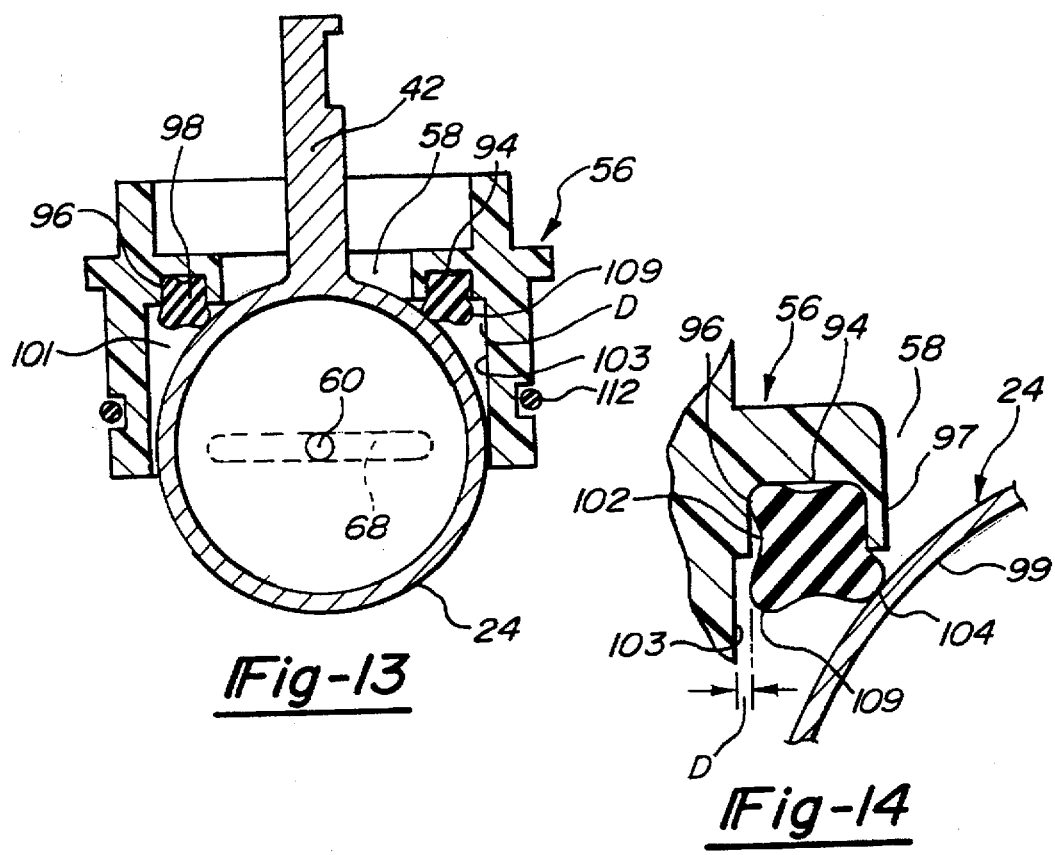
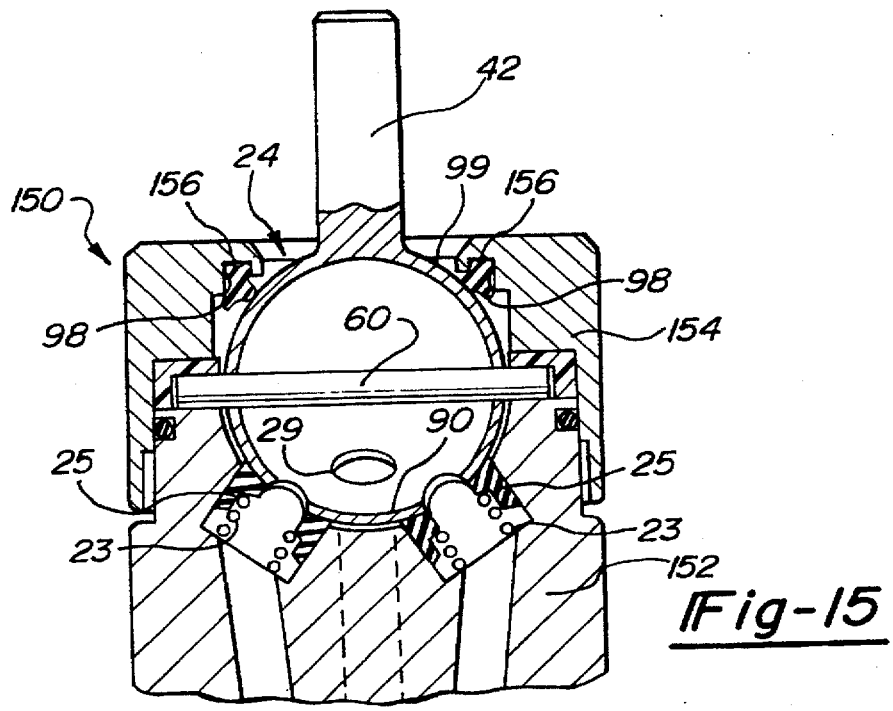

MIXER VALVE HAVING A BALL VALVE ELEMENT AND UPPER SEALING GASKET

TECHNICAL FIELD

The field of this invention relates to a mixer valve for a faucet incorporating a movable valve element housed in a cartridge and more particularly to a ball valve element housed in a cartridge.

BACKGROUND OF THE DISCLOSE

Single handle faucets, commonly referred to as mixer valves, that control both hot and cold water flow have seen vast consumer acceptance. These faucets are commonly constructed such that a handle or knob is movable in two distinct directions to adjust the mix of hot and cold water and to adjust the volume or flow rate.

The two basic types of mixer valves that have seen widest commercial acceptance are plate valves and ball valves. While ball valves offer a reliable one piece construction that is durable and easily assembled, plate valves offer a drive mechanism that allows motion to the handle in two desirable directions that appears to be universally accepted by the consumer. This desirable handle motion allows for an orbiting motion of the handle about a fixed longitudinal axis of the valve body and a rocking, i.e. pivoting, motion about a movable horizontal axis relative to the valve body. The horizontal axis is fixed with respect to the handle and is perpendicular to the longitudinal axis of the valve body. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

Recently, ball valves have been devised that allow the handle to be operated in the same fashion as the commercially accepted plate type mixer valve. These ball type mixer valves require the introduction of another moving part in the form of a rotatable plate mounted above the ball valve element. Furthermore, these ball valves have been combined with plate devices which can be adjustably positioned about a cover opening through which the handle controls the ball valve to limit the total flow rate. Alternately or in addition, these limiting devices limit the maximum ratio of hot water to cold water and consequentially the maximum temperature of the mixed water at the outlet.

Various disadvantages exist with a ball valve construction. In particular, the ball valve element is mounted between elastomeric inlet seals positioned about the inlet ports of the valve body and a sealing gasket that is mounted under the valve cover or gap. The elastomeric inlet seals and gasket are all yielding and render a floating characteristic to the ball valve element between the valve body and cap. There is no positive lock or locator mechanism that securely positions the ball valve in place. Because the ball valve can be moved in a translational manner against the elastomeric elements, the operator when operating the handle can also move the handle a small amount in any direction including directions not contemplated in the design of the mixing valve. This unwanted motion renders a undesirable spongy feel to the operation of the faucet and an uncertainty to the operator as to the proper operation of the faucet. Furthermore, the spongy feel of the handle gives the impression that the handle is unstable and not assembled properly.

The top sealing gasket provides three functions. Firstly, it seals against leakage of water about the ball. Secondly, its outer periphery seals against the inner surface of the housing to prevent leakage. Thirdly, the gasket resiliently positions the ball downwardly against the inlet seals. As a consequence, the gasket is an expensive component due to its mass and shape. To obtain a smooth operation, the elastomeric sealing gasket has a thin layer of tetraflouroethylene that contacts the ball valve to reduce wear as compared to direct contact of the elastomeric material with the ball member.

In order to reduce the floating feel, a regulation ring has been incorporated in many ball valve mixing valves. The regulation ring is adjustably screwed onto the valve cap. The regulation ring pushes the sealing gasket downward against the ball valve element which in turn is pressed against the inlet seals. The downward placement of the sealing gasket and ball valve element reduces the undesirable motion but does not eliminate it. Furthermore, the combining of the regulation ring with the known gasket increases the cost and complexity of the mixing valve. The increased pressure exerted in the sealing gasket wears the gasket down. As wear and tear progresses, the regulation ring must be repeatedly adjusted to restore pressure on the gasket to both seal and provide the handle with an operating resistance that maintains it in a stable position against gravitational forces exerted on a faucet handle.

Plate valves have often been incorporated into a cartridge format. The cartridge houses the movable and fixed plate. The cartridge can easily be removed and replaced with another in order to effect an easy repair to the faucet. The movable plate is driven by a control stem that has a small pivoting ball section. The equator of the ball section may have an elastomeric seal thereabout. The elastomeric seal may have a cross-section that is represented by a square cross-section; more precisely a square cross-section with concave sides to form four rounded vertices, two inner diameter vertices and two outer diameter vertices. The two inner vertices abut about the equator of the pivot ball and the two outer vertices abut against the housing or cartridge walls.

Ball valves have not been amenable to a cartridge construction. Firstly, the floating nature of the traditional ball valve demanded that any cartridge completely surround and capture the ball valve, otherwise the ball valve simply falls out of the bottom of the cartridge. Secondly, the compact nature of the ball valve construction leaves little room for the inclusion of a cartridge. The introduction of traditional cartridges that house and capture the ball into the faucet housing demands that the housing be made taller to incorporate the added height needed for the inclusion of the cartridge.

What is needed is a ball valve cartridge for a mixer valve that houses the upper sealing elements that seal against leakage to the exterior of the housing and seats a ball valve element. What is also needed is a ball valve cartridge that includes a ball valve element that duplicates the handle motion of known plate valves that provide for swinging of the handle about the longitudinal axis of the valve body while retaining the advantage of having only one movable piece to operate the valve, in other words, without the introduction of a separate moving part. What is also needed is a ball valve assembly that eliminates the need for a regulation ring and provides for a valve that eliminates the possibility of the handle moving in a fashion that is different from that needed for its proper operation.

SUMMARY OF THE DISCLOSURE

In accordance with one aspect of the invention, a mixer valve for liquids has a ball valve pivotably mounted in a valve receiving cavity of a housing. The cavity is in fluid communication with a plurality of inlet ports and at least one outlet port. The ball valve has at least a partially spherical surface and a plurality of inlet openings in its surface. The openings cooperate with the ports to control fluid flow through the ports. The valve housing has a control opening. The ball valve has a control stem passing through the control opening. The control stem is mounted generally orthogonal to an equator of the ball valve.

The mixer valve houses a cartridge housing. The cartridge housing member has an upper opening for allowing the control stem to pass therethrough. The ball valve is pivotably mounted to said cartridge housing. The cartridge has a lower opening through which said ball valve element protrudes to be cooperative with the inlet ports. The cartridge housing has a seal seat about the upper opening. A sealing gasket is seated in the seal seat about said upper opening in the cartridge housing and sealingly abuts against the ball valve element.

Preferably, the sealing gasket has a radially inwardly facing lip, i.e. vertex, that sealingly abuts the ball valve element. It is desirable that the sealing gasket is preloaded such that the lip is biased against the ball valve element. The preload is preferably caused by the seal seat about the upper opening being canted with its inner periphery positioned above its outer periphery. The sealing gasket has an unloaded position in which its inner and outer periphery are approximately coplaner. The sealing gasket is preloaded by twisting said gasket inner such that its inner periphery is above its outer periphery and is seated in the canted seal seat.

In accordance with another aspect of the invention, a mixing valve for a faucet incorporates the ball valve element and an operationally fixed member. The operationally fixed member may be a cartridge housing or a cap member for the housing body. The sealing gasket is arranged to establish a seal between the ball valve element and the operationally fixed member. The gasket has a cross-section that forms at least three vertices with the first and third vertices circumferentially spaced approximately 90° from the second vertex about a central axis.

Preferably a fourth vertex is also circumferentially spaced about 90° from said first and third vertices and approximately 180° from said second vertex. The gasket with four vertices is often referred to as a gasket seal with a square cross-section.

The first vertex is located at an upper outer diameter position on the gasket. The second vertex is at an upper inner diameter position. The first and second vertex sealingly abut against the operationally fixed member. The third vertex is located at a lower inner diameter position and sealingly abuts against the ball valve element.

The lower surface area of the gasket between the first and third vertices is exposed to faucet water pressure inside the operationally fixed member that can include the fourth vertex. In one embodiment the seal seat has its outer periphery radially inwardly spaced from the interior wall of the operationally fixed member.

Preferably a ring shaped member is positioned against the sealing gasket and has its inner diameter section biased by the sealing gasket into contact with the ball valve element. Preferably the fourth vertex biases the ring such that an inner corner of the ring contacts the ball valve element. The ring may have a substantially quadrangular cross-sectional shape such as a rectangle or trapezoid. It may have a generally flat planar relaxed state and biased to a frusto-conical canted shape when biased by said sealing gasket. The ring is used to increase the operation resistance of the ball valve element such that the operating handle does not spontaneously shift due to its own weight.

In one embodiment, the cartridge housing has an outer sealing ring thereabout for preventing leakage between the cartridge and a valve body in which it is mounted.

In accordance with another aspect of the invention a ball valve cartridge for a mixer valve includes a ball valve element with at least one inlet and an outlet. A cartridge housing has an upper opening for allowing a control stem passing therethrough that is connectable to the ball valve. The ball valve is pivotably mounted to the cartridge housing. The cartridge has a lower opening through which the ball valve element protrudes. The ball valve element directly abuts inlet seal elements at the downstream end of inlet ports in the valve body.

In accordance with another aspect of the invention, a faucet mixer valve has a movable valve element mounted in a housing body that defines a cavity. The body has a plurality of inlet ports and an outlet port in fluid communication with the cavity. The movable valve element cooperates with the inlet ports to control liquid flow in both flow rate and temperature mix through the ports. The valve body has a control opening therethrough which receives a control stem connected to the movable valve element. The mixer valve is in cartridge form with a cartridge having a housing member and an upper opening for allowing the control stem to pass therethrough. The movable valve element is movably mounted to the cartridge housing member. The cartridge has a lower opening through which said movable valve element protrudes to be cooperative with the inlet ports.

In this fashion, a valve element is incorporated into a valve cartridge without necessitating an increase in the overall height of the valve body. Furthermore, the seal that prevents leakage about the movable valve element and cartridge can have a minimal size and weight because the seal no longer has the double function of biasing and positioning the movable valve element against the inlet seal elements.

The vertices of the gasket with the square cross-section provide a durable and stable seal. The water pressure working on one side of the seal forces the seal to engage the ball valve as a direct function of the water pressure within the valve element cavity. As a result, the contact pressure between the gasket and ball valve element is automatically proportionate to the water pressure inside the faucet cavity. This ring is desirable when a larger heavier decorative faucet handle is mounted on the ball valve stem or when a longer heavier handle to accommodate handicapped people is mounted on the ball valve stem.

BRIEF DESCRIPTION OF THE DRAWINGS

Reference now is made to the accompanying drawings in which:

FIG. 2 is an exploded perspective view of the mixer valve shown in FIG. 1;

FIG. 3 is a cross-sectional view of the mixing valve lower body member taken along line 3—3 shown in FIG. 2;

FIG. 7 is a side elevational segmented and schematic view of the cartridge including the cartridge housing and ball valve element shown in FIG. 1.

FIG. 8 is an enlarged fragmentary view of FIG. 7 illustrating the sealing gasket interposed between the cartridge housing and ball valve element;

FIG. 9 is a view similar to FIG. 7 illustrating a second embodiment;

FIG. 10 is a view similar to FIG. 8 illustrating the second embodiment;

FIG. 11 is a side cross-sectional view of the ring shown in FIG. 9;

FIG. 12 is a view similar to FIG. 11 illustrating an alternate ring construction;

FIG. 13 is a view similar to FIG. 7 illustrating a third embodiment;

FIG. 14 is a view similar to FIG. 8 illustrating the third embodiment; and

FIG. 15 is a side elevational and cross-sectional view of a faucet mixing valve illustrating a cartridgeless embodiment of the invention.

DETAILED DESCRIPTION OF THE PREFERRED EMBODIMENT

Figure 1:
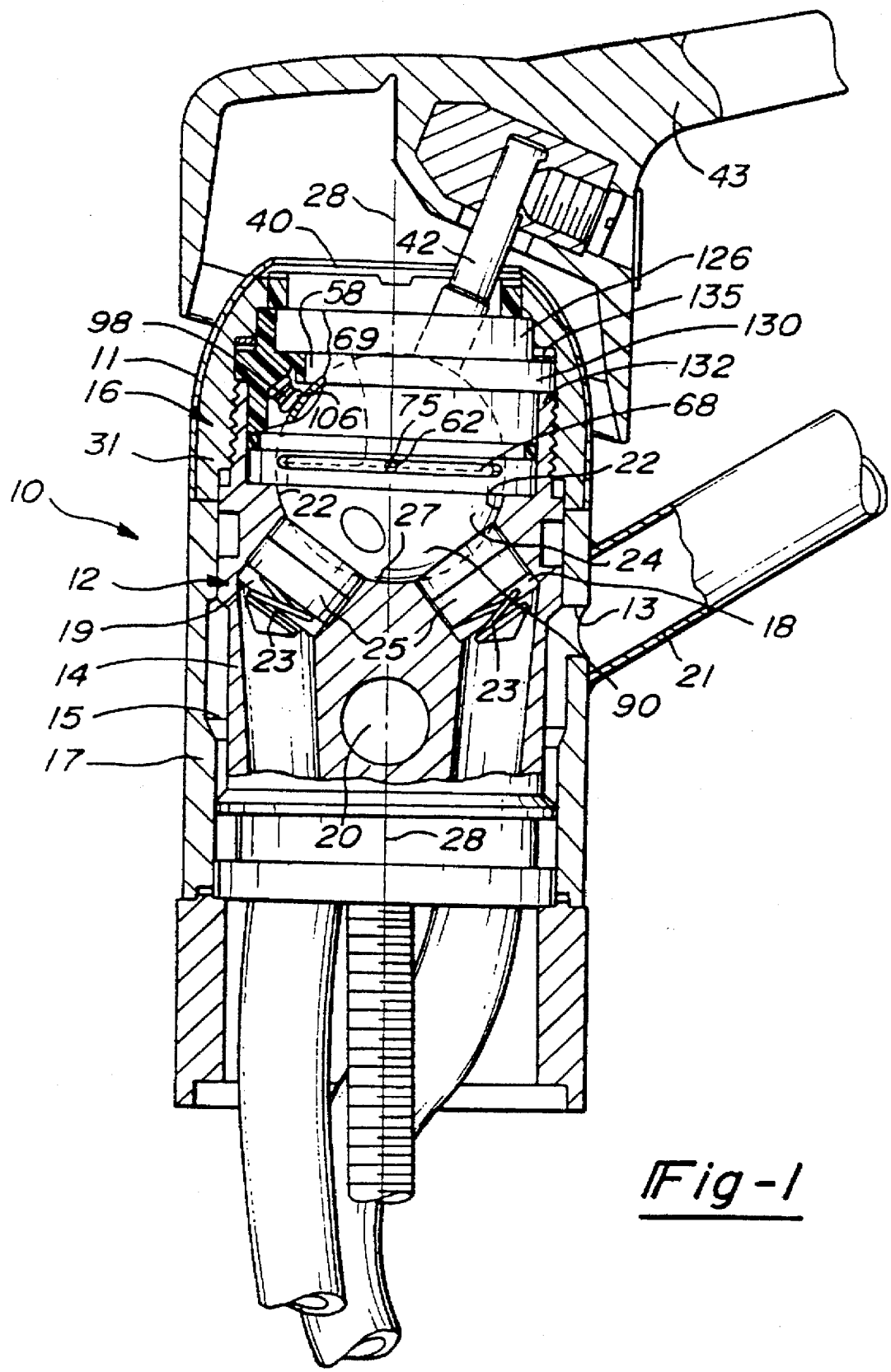
FIG. 1 is a side elevational and segmented view of a mixer valve illustrating one embodiment of the invention.

Referring to FIGS. 1 and 2, a mixer valve 10 includes a valve housing 12 that is formed from a lower base member 14 and a cover assembly 16. The base member 14 has a cavity 22 formed therein with two inlet ports 18 and 19 for cold and hot water and has an outlet port 20 for the passage of mixed water in communication with cavity 22. The downstream ends of ports 18 and 19 are counter-bored to form a seat for two biasing springs 23 which bias tubular elastomeric sealing elements 25 against the ball valve element 24. The holes therethrough have a diameter of approximately 6.5 mm. The port 18 and 19 have their downstream ends positioned at approximately 40° up from the bottom point 27 of cavity 22. Furthermore, the ports 18 and 19 are circumferentially positioned approximately 15° from the fore and aft plane as measured from the vertical axis 28.

A tubular shell 17 is sealingly and slidably mounted about the body 14 and forms an annular chamber 15 in fluid communication with the outlet port 20. A spout 21 is affixed to the shell and in fluid communication with the annular chamber 15 through aperture 13 in shell 17.

The cover 16 includes a threaded member 31 is screwed onto the base member 14. A cosmetic shell 11 is positioned over the member 31. The valve cavity 22 has a substantially semi-spherical lower surface sized to receive a ball valve element 24 that is housed in a cartridge 26. The cover 16 affixes the cartridge 26 in the cavity 22. The base member 14 has an upright collar flange 70 with a keyed slot 71 that receives a key 72 of cartridge 26 to correctly orient the cartridge in the mixer valve 10.

The ball valve element 24 has a substantially spherical valve surface 29 with cold inlet openings 30 and 32, hot inlet openings 34 and 36, and outlet opening 38 therethrough. The openings 30 and 32 cooperate with the cold inlet port 28, openings 34 and 36 cooperate with hot inlet port 19, and outlet opening 38 cooperates with outlet port 20 respectfully to regulate the passage of water from the two inlet ports 18 and 19 to the outlet port 20 by regulating the mixture ratio from the two inlet ports 18 and 19 and the flow rate, i.e. volume of total water per unit time.

The cover assembly 16 has a control opening 40 therethrough. The cover 16 is positioned such that the longitudinal axis 28 of the housing passes through the control opening 40. The cartridge 26 includes a housing member 56 that has an upper opening 58 aligned under opening 40.

A control stem 42 is fixedly connected to the ball valve element 24 at its upper section 99. The control stem is mounted generally orthogonal to the equator of the ball valve between upper section 99 and lower section 90. The control stem 42 extends through the control opening 40. The control stem 42 is constructed to be attached to a faucet handle 43 in a conventional fashion.

The ball valve element 24 is pivotably mounted to the cartridge housing member 56. The housing member 56 may be manufactured from known plastic material suitable for faucet applications. The ball valve element 24 also has a cylindrical pin 60 extending therethrough with its distal ends 62 extending to the exterior of ball valve surface 29. Holes 61 are sized to slidably receive the pin 60. The pin 60 is positioned to intersect the center 66 of ball valve 24 and lie perpendicular to control stem 42. The pin can be welded in place as described in more detail later.

Each distal end 62 is positioned in a circumferentially disposed slot 68 formed in the cartridge housing 56. As shown in FIG. 3, each slot 68 has a central axis disposed in a plane 69 perpendicular to axis 28. Because the ends 62 are cylindrical in shape, they have a circular cross-section that allows them to pivot in slots 68 about an axis 75 that is perpendicular to axis 28.

The circumferential ends 74 of the slots 68 form stop shoulders 76 for the distal ends 62. The slots 68 are vertically dimensioned to form only enough clearance to allow sliding movement of the pin ends 62 in slot 68. Desirably no vertical spacing exists between slot 68 and the ends 62.

Figure 4:
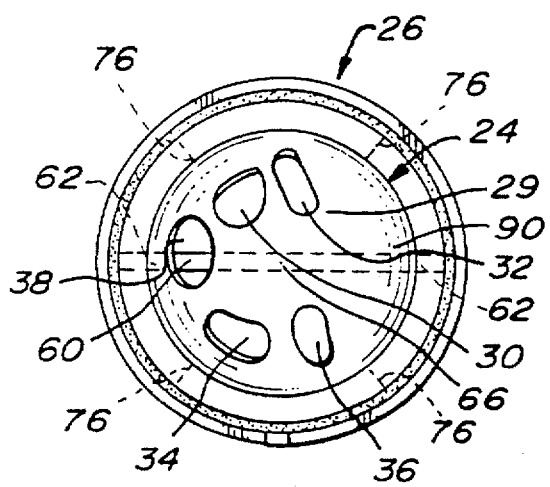
FIG. 4 is a bottom elevational view of the cartridge shown in FIG. 2.

The ball valve element 24 has a lower section 90 of the valving surface 29 protruding through the large lower open end 92 of the cartridge housing 56. The protruding section 90 is a significant portion of the ball. Approximately just under half of the spherical valving surface 29 protrudes under the cartridge lower opening 92 at any given time as clearly shown in FIGS. 4 and 7. The valving surface 29 with the openings 30, 32 34, and 36 operably abuts the spring biased sealing elements 25.

The upper section 99 of ball element 24 is housed within the interior chamber 101 of cartridge housing 56 defined in part by interior depending cylindrical wall 103. The interior chamber 101 is a fluid communication with cavity 22 of valve housing 12.

Figure 6:
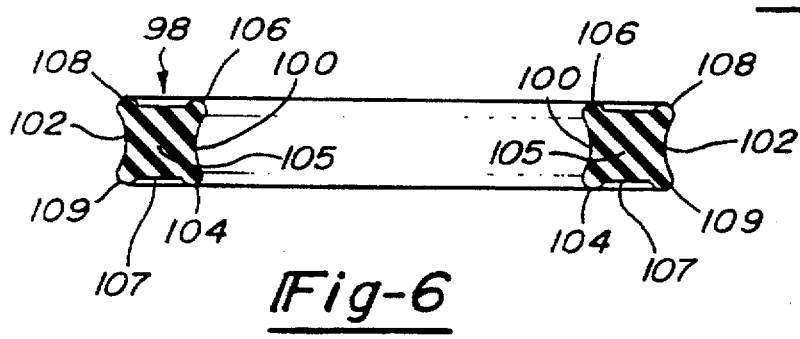
FIG. 6 is a cross-sectional view of the gasket shown in FIG. 1 in an unloaded condition.

The annular gasket seat 94 is positioned about the upper opening 58 and faces ball element 24 within chamber 101. The gasket seat 94 is canted with its inner periphery 95 positioned higher than its outer periphery 96. A downwardly depending shoulder or collar 97 vertically depends at the inner periphery. An annular gasket seal ring 98 is mounted in the cartridge housing 56 against the seat 94 such that it is place under a preload with its inner periphery 100 twisted to be higher than its outer periphery 102. The gasket seal ring 98 has four rounded peripheral lip sections i.e. vertices 104, 106, 108, and 109. Each vertex 104, 106, 108 and 109 is circumferentially spaced approximately 90° from an adjacent vertex about central annular axis 105 of the gasket. Vertices 104 and 108 oppositely positioned at approximately 180° and vertices 106 and 109 are similarly 180° spaced apart. One of the vertices 104 positioned at a lower inner diameter position on the gasket abuts the ball valve element 24 and provides a seal therebetween against leakage of water. The respective upper inner and outer diameter positioned vertices 106 and 108 abut the canted seat 94 with inner diameter vertex 106 being positioned higher than outer diameter vertex 108 as clearly shown in FIGS. 7 & 8. The gasket seal ring 98 is shown in FIG. 6 in the unloaded position with the vertices 106 and 108 being horizontally aligned. The upper section 99 of ball surface 29 that abuts gasket seal ring 98 is properly polished to the appropriate smoothness to provide a proper seal with the gasket.

With this seal construction, any water pressure within chamber 101 defined by cartridge housing 56 acts both upon lower seal surface 107 situated between vertices 104 and 109 and upon the outer periphery 102 situated between vertices 108 and 109 of the cross section of gasket 98. The pressure acting on the lower surface 107 situated between vertices 104 and 109 only tends to keep gasket 98 effectively engaged in seat 94 about shoulder 97 from being accidentally expelled even if the pressure increases in an abnormal fashion. The pressure acting on the outer periphery 102 situated between vertices 108 and 109 of the cross section of gasket 94 tends to deform the latter, pushing vertex 104 into contact under pressure against ball valve element 24. This contact pressure of vertex 104 with an increase in the pressure in chamber 101 and therefore maintains an efficient hold when the pressure is raised, although without maintaining a uselessly high value when the pressure in chamber 101 is reduced or at zero. The invention provides the advantage of being able to use a standard and economical gasket made of commercially available elastomer material, while still getting reduced resistance exerted on the ball valve element when its being operated and reduces wear and tear in the gasket itself. The vertex 109 of gasket 98 is spaced from the lateral wall 103 of cartridge housing 56 so that the pressure prevailing in chamber 101 of the cartridge can act on the outer periphery 102 of gasket 98, which is between vertices 108 and 109. The spacing is obtained by arranging gasket 98 in an inclined position due to the inclination of seat 94. On the other hand, the manner of implementation according to FIGS. 13 and 14 can be modified. The seat of the cartridge housing 56 is not inclined but has its radial outer periphery spaced a slight distance D from the lateral wall 103 of cartridge housing 56. Similarly, vertex 109 of gasket 98 remains spaced form the lateral wall 103 of the cartridge housing 56, and the entire assembly works exactly the same way as already described for the first embodiment.

In the two examples shown, the water pressure extends about of the fourth vertex 109 of the cross section of the gasket 98 with respect to the lateral wall 103 of the cartridge housing 56 by spacing these parts slightly apart from each other. However, the same effect can also be obtained by interrupting the continuity of the vertex 109 of gasket 94. This can be achieved by making some cuts in a standard-production gasket or by making an appropriate gasket where although the cross section for the most part corresponds to that of a gasket with a square cross-section the edge corresponding to the fourth vertex 109 of the cross-section is interrupted or is missing.

The outer periphery 110 of the cartridge housing 56 has an annular groove 111 which seats an O-ring 112. The O-ring 112 is sized to seal the cartridge outer periphery 110 with the cavity 22 in lower body member 14 of housing 12. Rocking of the control stem along a plane containing the longitudinal axis 28 pivots the ball valve element 24 about the pivot axis 75 independently of the rotated position of the ball valve member about axis 28. Furthermore, the distal ends 62 may slide along slots 68 to allow the ball valve element 24 to rotate about axis 28 when the control stem 42 is swung about the longitudinal axis 28.

The rotation of the ball valve element 24 about axis 28 is limited by the position of the stop shoulders 76 that abut the distal ends 68. Mixer valve having different applications may have different rotation angles established by the circumferential positioning of stop shoulders 76. The rotation of the ball valve element 24 as illustrated adjusts the ratio mix and thus the temperature of the discharged mixed water.

Figure 5:
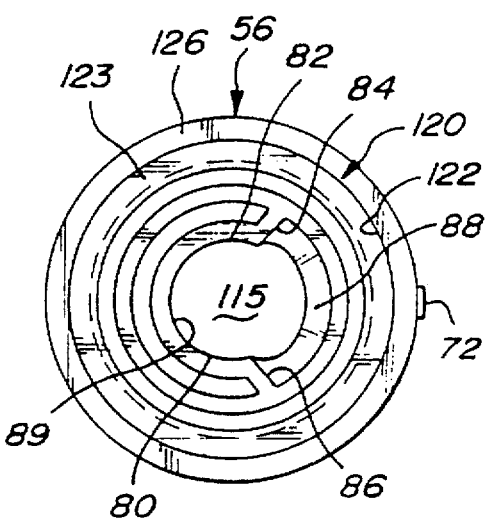
FIG. 5 is a top plan view of the cartridge housing shown in FIG. 2.

Alternately, or in addition to the stop shoulders 76, the rotation of the ball about axis 28 may also be limited by radially extending edges 80, 82, 84, and 86 of upper aperture 115 in guide template 120 that fits within upper recess 122 about aperture 58 in cartridge housing 56 as shown in FIG. 5. Recess 122 is surrounded by an annular retaining collar 126. The stem 43 when it abuts the edges 80–86 is prevented from further movement beyond the respective edges. Edges 80 and 82 define the cold limit and edges 84 and 86 define the hot limit. The edges 80–86 allow the ball to rotate about vertical axis 28 for approximately 90°.

The upper opening 58 also has circumferential edges 88 and 89 that control the extend of rocking motion about axis 75 of pin 60 from the off position to the full on position respectively.

The cartridge is assembled with the gaskets 98 and. 112 properly seated. Ball valve element 24 is then positioned against gasket 98 and slightly pressed to bias the gasket 98. The pin 60 is then passed through the slots 68 and holes 61 in ball surface 29. The bias of the gasket 98 onto the ball 24 provides a frictional fit of the pin ends 62 onto the lower surface 67 of each slot 68 that prevents the pin 60 from falling out. Template 120 is then placed in recess 122. The template 120 has an outer thin flange 123 that can be either press fitted or snap fitted in recess 122. The assembled cartridge 26 is a self contained assembly that can be sold separately as a repair replacement for later installation into the faucet mixer valve 10.

The assembled cartridge 26 is placed in cavity 22 of the faucet body 14. The slot 72 properly positions the cartridge 26 in the cavity and ledge 130 properly vertically positions the cartridge 26 on a corresponding ledge 132 in base member 14. Cover 16 is then threaded onto the upright flange 70 with a spring loaded corrugated ring 135 interposed between the cartridge 25 and cover 16 to downwardly bias the cartridge 26 against ledge 132.

The minimum clearance between ends 62 of pin 60 and slots 68 in the vertical direction prevents vertical displacement of the ball valve element 24 with respect to the valve housing 12 and cartridge housing 56. Consequently, the control stem does not show any instability or render a spongy feel to the operator when the ball is pivoted along its two prescribed pivotable directions.

With the sealing gasket and cartridge described so far, it could happen in certain circumstances that the wear and tear between gasket 98 and ball valve element 24 particularly when the pressure in chamber 101 is low or zero can overly be reduced as to not sufficiently ensure the stability of the faucet operating handle, which could be shifted by virtue of the weight of the operating handle or due to minimal external actions. This can be more noticeable with larger heavier decorative handles 43 or longer larger handles that are specialized for use by handicapped people. If there is reason to fear that this spontaneous shifting of the handle may occur it is possible to adopt the arrangement shown in FIGS. 9 and 10. In this embodiment, a ring-shaped member 140 is inserted between the lateral wall 103 of cartridge housing, the ball valve element 24, and gasket 98. The ring-shaped member 140 rests against the lower correspondence to the side 107 situated between vertices 104 and 109. Ring-shaped member 140 is pushed elastically against ball valve element 24 by lower side 107, possibly be vertex 109 of gasket 98. The inner diameter lower corner 142 of ring member 140, which rests against ball valve member 24, brakes the shifting of the latter, and this frictional resistance action is added to the frictional resistance exercised by gasket 98, stabilizing the faucet operating handle 43 when the pressure in chamber 101 is low or zero. However, this frictional resistance of ring 140 tends to be reduced with an increase in internal pressure, because of the upward push exerted by the water pressure against the lower surface 107 which lessens the force the gasket exerts on the ring 140. Therefore, this arrangement tends to compensate and lessen the variations of operating resistance of the ball valve element against its being moved, although without modifying the variation of the holding action of gasket 98 that is generated by the variation in water pressure in chamber 101. Ring member 140 does not establish any contact against the lateral wall 103 of the cartridge housing 56.

Ring-shaped member 140 in its operational configuration assumes a truncated cone i.e. frustum shape as shown in FIGS. 9 and 10. The ring 140 may have such a design shape as shown in FIG. 11 in its relaxed state, or it can be simply flat in its relaxed state as shown in FIG. 12 and can be deformed by the forces applied to it during installation in the faucet. It is thus evident that if applied in a manner of implementation to a cartridge housing with a flat sear as shown in FIGS. 13 and 14, ring-shaped member 140 can maintain a configuration during installation and use. In the form illustrated said ring-shaped member 140 has a substantially rectangular cross section, but in practical models, it can assume, a trapezoidal shape or other quadrangle shape with its lower inner diameter corner 142 making the contact with the ball valve element 24.

Gasket 94 as is common with many gaskets used in faucets, is coated with a lubricating grease. One useful function of ring-shaped member 140 consists in reducing the tendency of the wear, which is in chamber 101 to remove this layer of lubricating grease from gasket 94 by wiping it off the section of ball valve element 24 before it slides below the ring 140 into water filled chamber 101.

The ring 140 besides having the above clarified compensation of reducing the variation of the operating resistance with respect to the variation in water pressure also has a long term compensation effect on the operating resistance. As the active corner 142 wears down through use, its additive effect on the operating resistance to the faucet is reduced. This is advantageous because other parts of the faucet (particularly the tubular elastomer sealing rings 25 tend to increase their own operating resistance with continuing use, because of the gradual removal of a layer of lubricating grease or of anti-friction material applied upon them. Therefore, the reduction of the operating resistance created by ring-shaped member 140 in terms of time tends to compensate for a tendency inherent in the faucet itself to increase the operating resistance with the passage of time. It must be noted that the useful effect performed by ring-shaped member 140 in preventing the removal of the lubricating grease from gasket 98 is not harmed by the wear of the contact cover 144 of ring-shaped member 12 with ball valve element 24.

As shown in FIG. 15, the ball valve element 24 and sealing gasket 98 may be incorporated in a cartridgeless faucet 150. The faucet has a body 152 and a cap member 154. The cap member 154 has a seat 156 that seats gasket 98 in the same fashion as described above.

The need for a large resilient biasing regulation ring intended to push down the call valve element 24 against the spring biased sealing elements 25 is eliminated. Gasket seal ring 98 functions to prevent leakage between the ball valve element 24 and cartridge housing 54 and to provide a portion of the operating resistance of the ball valve element 24. The O-ring functions solely to prevent leakage between the cartridge housing 56 and lower body member 14. The vertical position of the ball valve element 24 is affixed within the cartridge housing 56 by the pin 60 and slots 68. Furthermore, any adjustment ring 160 member that has previously been needed to provide proper bias of the ball valve 24 against seal elements 25 becomes optional.

Furthermore, the ball valve element 24 is incorporated into an easily replaceable valve cartridge 26 without necessitating an increase in the overall height of the valve housing 12 as compared to prior art mixing valves incorporating ball valve elements. Furthermore, the cartridge is retrofittable or usable in the standard base 14 that has been previously been fitted with ball valves found in the prior art if the ball valve has the properly designed inlets and outlet.

The use of the invention makes it possible to employ in ball valve mixing facets a sealing gasket with a square cross-section consisting of elastomer material which is commercially available, which is a rather low-cost item, and offers high resistance to deformation. The invention makes it possible in a regulated manner to reduce the resistance created by the sealing gasket 98 and ensures an advantageous reduction in the wear and tear of the gasket by limiting the forces which are applied onto the gasket.

Variations and modifications are possible without departing from the scope and spirit of the present invention as defined by the appended claims.

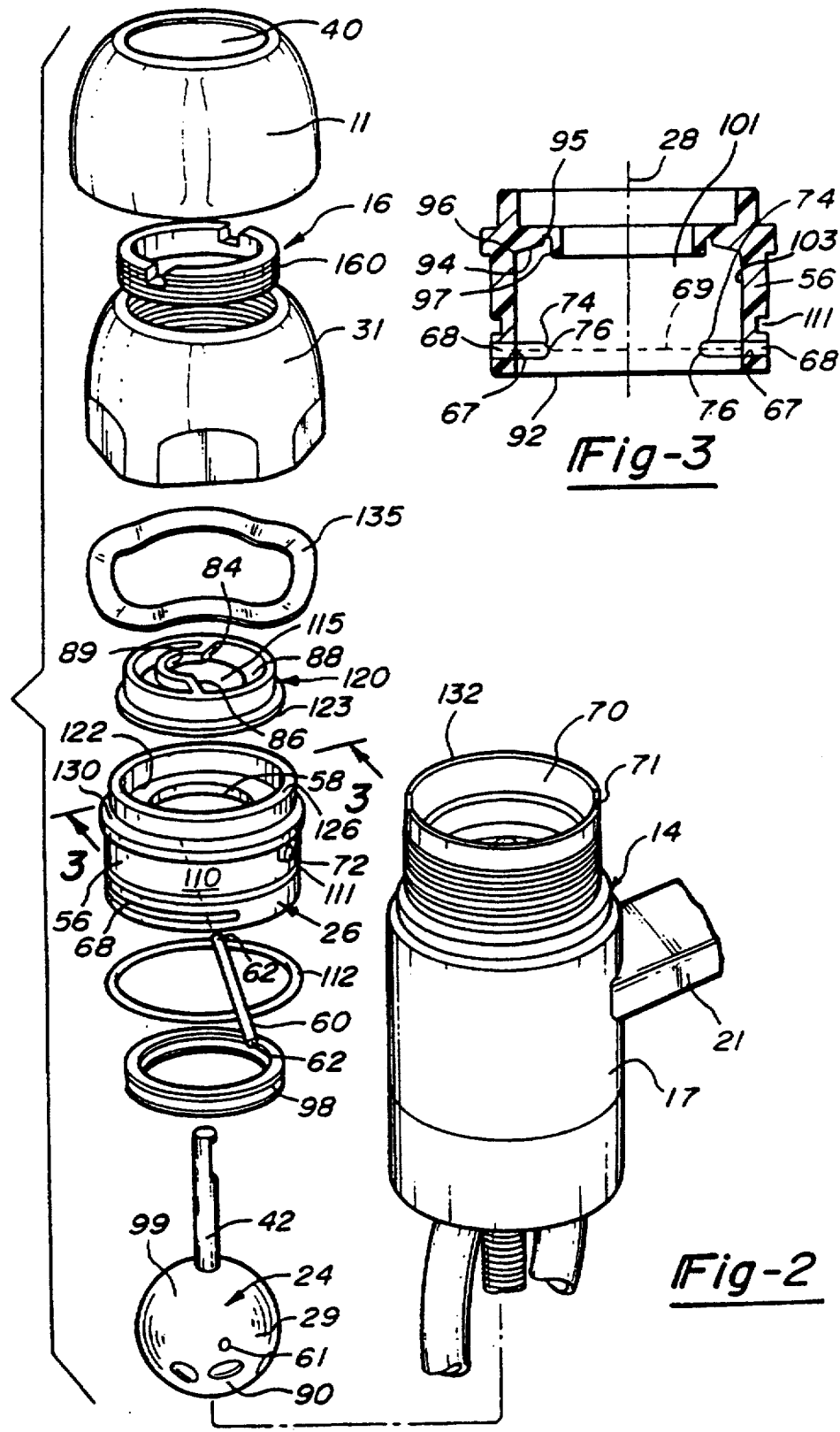

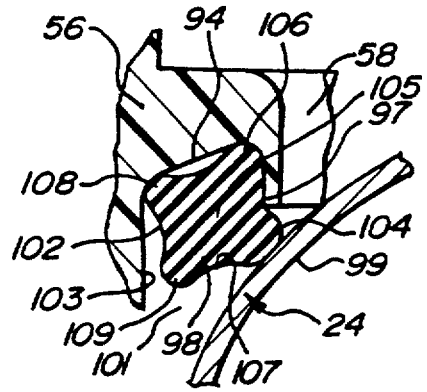
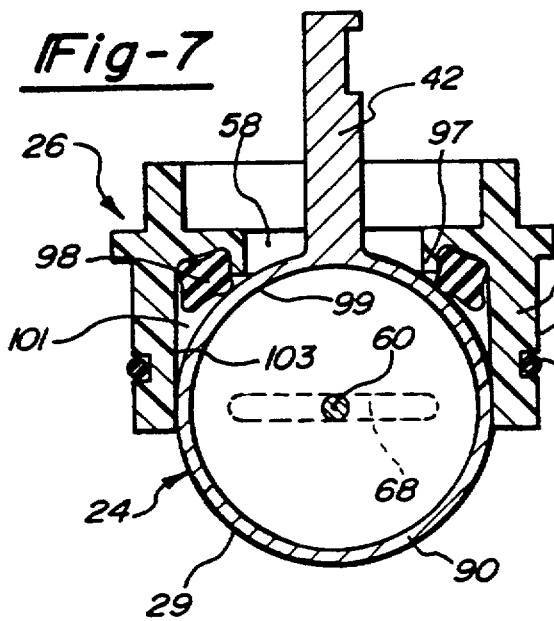
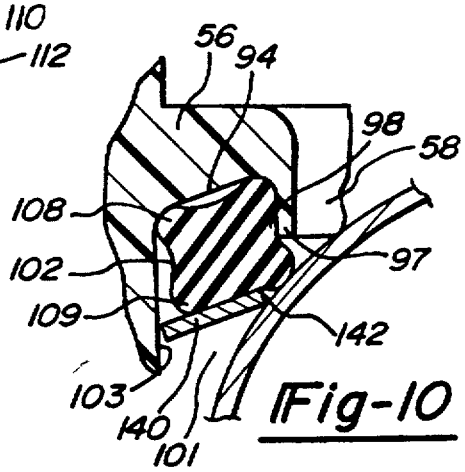
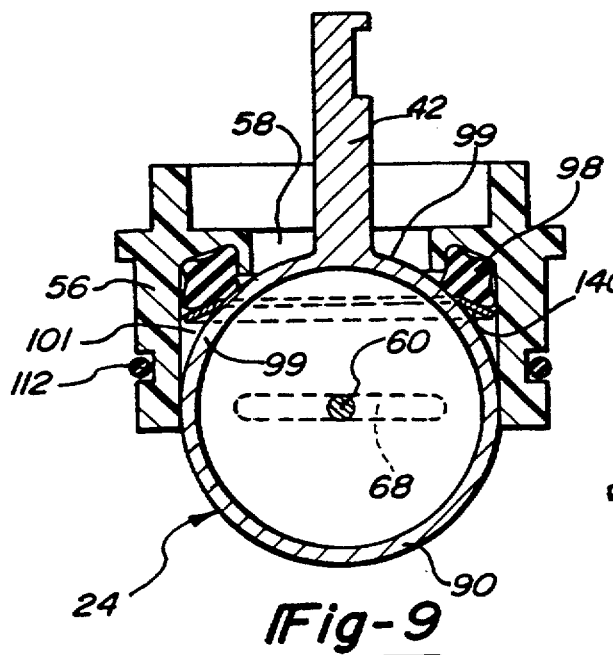
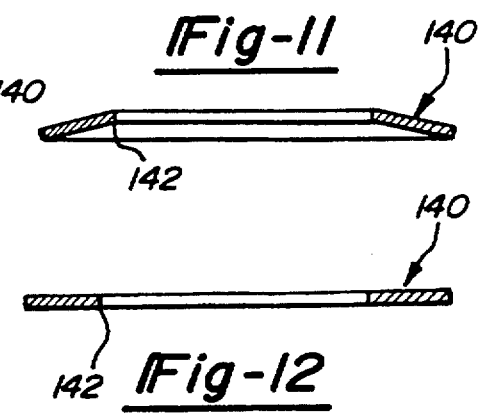

I claim:

1. In a single control mixing faucet that includes an operationally fixed member and a ball valve element having at least one inlet, an outlet; and a control stem for attachment to a handle extending generally orthoganal to an equator of said ball valve element; said ball valve element being retained by said operationally fixed member with an opening therethrough; said control stem passing through said opening; and a sealing device; said sealing device characterized by:

a gasket arranged to establish a seal between said ball valve element and said operationally fixed member;

the gasket having a cross-section that forms at least three circumferentially spaced vertices such that the first and third vertex are approximately 90° from the second vertex from a central axis with said first vertex being located at an upper outer diameter position on said gasket and said second vertex located at an upper inner diameter position on said gasket;

said first and second vertices sealingly abut against said operationally fixed member;

said third vertex located generally at a lower inner diameter of said gasket and sealingly abuttable against an upper section of said ball valve element between said control stem and said equator;

the gasket having a lower surface area between the first and third vertices being exposed to internal water pressure inside the operationally fixed member.

2. In a single control mixing valve as defined in claim 1 wherein said gasket has a fourth vertex that is spaced from both the operationally fixed member and said ball valve element and being exposed to internal water pressure inside the operationally fixed member, said fourth vertex being circumferentially spaced approximately 90° from said first and third vertex.

3. In a single control mixing faucet as defined in claim 1 further characterized by:

said operationally fixed member is a cap member that is mounted directly to a housing body of said faucet.

4. In a single control mixing faucet as defined in claim 1 further characterized by:

said operationally fixed member is a cartridge housing that is mountable in a housing body of said faucet.

5. In a single control mixing faucet as defined in claim 4, further characterized by:

said operationally fixed member having a seal set about said opening;

said sealing gasket seated in said seal seat with said first and second vertices sealingly engaged against said seat.

6. In a single control mixing faucet as defined in claim 5 further characterized by:

said sealing seat about said opening being canted with its inner periphery position above its outer periphery.

7. In a single control mixing faucet as defined in claim 5 further characterized by:

said seal seat having its outer periphery spaced radially inward from a downwardly dependent lateral wall of said operationally fixed member.

8. In a single control mixing faucet as defined in claim 1 further characterized by:

a ring shaped member positioned against said sealing gasket and having an inner diameter section biased into contact against said ball valve element by said sealing gasket.

9. In a single control mixing valve as defined in claim 8 wherein said gasket has a fourth vertex that is spaced from both the operationally fixed member and said ball valve element and being exposed to internal water pressure inside the operationally fixed member, said fourth vertex being circumferentially spaced approximately 90° from said first and third vertex;

said fourth vertex abuts said ring and biases said ring to abut against said ball valve element.

10. In a single control mixing faucet as defined in claim 1 further characterized by:

said ring having a substantially quadrangular cross-sectional shape and having a flat planar relaxed state.

11. In a single control mixing faucet as defined in claim 10 further characterized by:

said ring having a truncated conical shape when said gasket exerts its biasing force thereon and has an inner diameter corner abut against said ball valve.

12. In a single control mixing faucet as defined in claim 8 and further characterized by:

said ring having a substantially quadrangular cross-sectional shape and a truncated conical shape in a relaxed state;

said ball valve abuts against an inner diameter corner of said ring.

\* \* \* \* \*

UNITED STATES PATENT AND TRADEMARK OFFICE
CERTIFICATE OF CORRECTION

PATENT NO. : 5,664,603
DATED : September 9, 1998
INVENTOR(S) : Alfons Knapp

It is certified that error appears in the above-identified patent and that said Letters Patent is hereby corrected as shown below:

Column 1, line 10, after "The" delete "disclose" and insert therefor —disclosure—.

Column 3, line 64, after "substantially" delete "guadrangular" and insert therefor —quadrangular—.

Column 5, line 61, after "20" delete "respectfully" and insert therefor —respectively—.

Column 6, line 47, after "is" delete "a" and insert therefor —in—.

Column 6, line 56, after "is" delete "place" and insert therefor —placed—.

Column 7, line 19, after "gasket" delete "94" and insert therefor —98—.

Column 7, line 50, after "gasket" delete "94" and insert therefor —98—.

Column 8, line 20, after "the" delete "extend" and insert therefor —extent—

Column 9, line 34, after "gasket" delete "94" and insert therefor —98—.

Column 9, line 39, after "gasket" delete "94" and insert therefor —98—.

Column 9, line 59, delete "cover 144" and insert therefor —corner 142—.

Column 9, line 60, after "member" delete "12" and insert therefor —140—.

Signed and Sealed this

Nineteenth Day of January, 1999

Attest:

*Attesting Officer*

*Acting Commissioner of Patents and Trademarks*

UNITED STATES PATENT AND TRADEMARK OFFICE
CERTIFICATE OF CORRECTION

PATENT NO. : 5,664,603
DATED : September 9, 1998
INVENTOR(S) : Alfons Knapp

It is certified that error appears in the above-identified patent and that said Letters Patent is hereby corrected as shown below:

IN THE CLAIMS:

Column 10, line 5, after "o-ring" insert therefor --112--.

Column 10, line 21, after "mixing" delete "facets" and insert therefor --faucets--.

Column 11, line 12, delete "set" and insert therefor --seat--.

Column 12, line 10, after "valve" delete "element" and insert therefor --,--.

IN THE DRAWINGS:

Please include the number 110 in Figures 2 and 7 as indicated in the attached drawings.